US008670491B2

(12) United States Patent
Na et al.

(10) Patent No.: US 8,670,491 B2
(45) Date of Patent: *Mar. 11, 2014

(54) DEVICE AND METHOD FOR TIME SYNCHRONIZATION IN A COMMUNICATION NETWORK

(75) Inventors: Chongning Na, Beijing (CN); Dragan Obradovic, Ottobrunn (DE); Ruxandra Scheiterer, Geretsried (DE); Guenter Steindl, Poppenricht (DE); Philipp Wolfrum, München (DE)

(73) Assignee: Siemens AG, Munich (DE)

( * ) Notice: Subject to any disclaimer, the term of this patent is extended or adjusted under 35 U.S.C. 154(b) by 508 days.

This patent is subject to a terminal disclaimer.

(21) Appl. No.: 12/882,940

(22) Filed: Sep. 15, 2010

(65) Prior Publication Data

US 2011/0064177 A1    Mar. 17, 2011

(30) Foreign Application Priority Data

Sep. 17, 2009   (EP) ..................................... 09011892
Feb. 22, 2010   (EP) ..................................... 10001777

(51) Int. Cl.
*H04L 27/00*   (2006.01)

(52) U.S. Cl.
USPC ........... 375/256; 375/257; 375/260; 375/355; 375/356; 375/297

(58) Field of Classification Search
USPC ........... 375/256, 260, 297, 355, 356; 370/503
See application file for complete search history.

(56) References Cited

U.S. PATENT DOCUMENTS

| 6,111,927 | A  | * | 8/2000  | Sokoler ......................... 375/365 |
| 6,343,235 | B1 | * | 1/2002  | Hausen et al. .................. 700/42 |
| 2005/0201421 | A1 | * | 9/2005 | Bhandari et al. ............. 370/519 |
| 2006/0245454 | A1 | * | 11/2006 | Balasubramanian et al. 370/509 |
| 2009/0086766 | A1 |   | 4/2009 | Gotz et al. |

FOREIGN PATENT DOCUMENTS

EP            2 034 642         3/2009

OTHER PUBLICATIONS

Scheiterer, R. L. et al., "Synchronization Performance of the Precision Time Protocol in Industrial Automation Networks", ISPCS07 Special Issue of the IEEE Transactions on Instrumentation and Measurement, Jun. 2009, vol. 58, Issue 6, pp. 1849-1857.
Jasperneite, J. et al., "Enhancements to the Time Synchronization Standard IEEE-1588 for a System of Cascaded Bridges", Proc. of 2004 IEEE Intern. Workshop on Factory Communication Systems 2004, pp. 239-244.

\* cited by examiner

*Primary Examiner* — Qutbuddin Ghulamali
(74) *Attorney, Agent, or Firm* — Cozen O'Connor

(57) ABSTRACT

A device and method for time synchronization in a communication network, wherein a virtual clock is produced by a controller in each network node based on the PROFINET-Standard and/or the Precision Transparent Clock Protocol. In contrast to known methods for estimating the time, the time of the virtual clock does not undergo sudden changes. The virtual clock includes a controlled, continuous path. As a result, the virtual clock is particularly suitable for time-critical applications. Here, the estimation of the time of a reference clock is improved by 18-35%. Accordingly, a markedly greater number of network nodes may be synchronized with a predetermined level of accuracy for the time synchronization.

16 Claims, 4 Drawing Sheets

--PRIOR ART--

DEVICE AND METHOD FOR TIME SYNCHRONIZATION IN A COMMUNICATION NETWORK

BACKGROUND OF THE INVENTION

1. Field of the Invention

The present invention relates to communications networks and, more particularly, to a device and method for time synchronization in a communication network, by which an estimation of a pulse counter status of a reference clock is further improved and/or by which a greater number of network nodes may be incorporated in the time synchronization with a predetermined level of accuracy.

2. Description of the Related Art

Communication networks are used in many technical fields to control operating sequences in a decentralized manner. Particularly, in industrial automation systems, it is quite important to precisely coordinate the automatic operating processes with one another. This is achieved by the individual network nodes in the communication network that communicate with one another in each case comprising internal clocks and synchronization messages being transmitted to synchronize all the internal clocks. The internal clock of one respective network node thus operates at a corresponding node clock frequency, which in some instances may be different for the individual network nodes. The clocks are synchronized based on a predetermined reference clock (i.e., "Grandmaster clock") and/or the reference clock frequency thereof, where the synchronization messages are transmitted according to the reference clock frequency. As a result, synchronization messages are transmitted at fixed clock intervals according to the reference clock frequency.

The individual synchronization messages transmitted in the communication network contain the pulse counter status of the reference clock. Each network node updates this pulse counter status for actual requirements by estimating the number of pulses of the reference clock between the transmission of the synchronization message at the preceding network node and the receipt of the synchronization message at the respective network node (i.e., "line delay"). Moreover, each network node updates this pulse counter status for the next node, by also estimating the number of pulses of the reference clock between the receipt of the synchronization message and the transmission of the synchronization message (i.e., "bridge delay"). Generally, this estimation is performed by estimating, among other things, the pulse ratio (e.g., the "Rate Compensation Factor" (RCF)) between the reference clock frequency and the node clock frequency of the respective network node. Thus, by using the estimated pulse ratio for each desired time interval, the number of pulses of the node clock frequency may be converted into the corresponding number of pulses of the reference clock frequency. Thus, for example, the time interval between the transmission of a synchronization message at the preceding network node and the transmission of the synchronization message at the respective network node, measured in node clock frequency pulses, may be converted into reference clock frequency pulses. The resulting number of pulses is then added to the pulses of the received synchronization message and a correspondingly updated synchronization message is again transmitted from the corresponding network node.

In the field of industrial automation, the International Electrotechnical Commission (IEC) Standard No. 61158 Type 10, i.e., Process Field Network (PROFINET), which is an Ethernet, and which meets industrial requirements is known. This PROFINET Standard operates according to the principle set forth above, according to which the pulse counter statuses in the synchronization messages are updated in the network nodes. Generally, PROFINET-based systems use the Precision Transparent Clock Protocol (PTCP) according to IEC 61158 Type 10 PTCP, which is also referenced as "Profile" in the Institute of Electrical and Electronic Engineers (IEEE) Standard 1588 V2 to synchronize the internal clocks of the network nodes.

This updates the pulse counter statuses of the synchronization messages according to the principle set forth above. According to this standard, synchronization messages are transmitted in succession from one network node to the next in a logical sequence or tree structure. The synchronization messages originate from a reference node and/or master element, which is the first element in the sequence and/or in the tree structure. The synchronization messages originally contain a time stamp of the counter of a reference clock in the reference node, when a synchronization message has been transmitted. The network nodes in the sequence and/or tree structure, i.e., slaves, process and forward this information. A network node thus adds all the estimated time delays between transmission of a synchronization message from the preceding network node and its own transmission of the synchronization message as content to the synchronization message.

A practical implementation is disclosed in R. Lupas Scheiterer, C. Na, D. Obradovic and G. Steindl: "Synchronization Performance of the Precision Time Protocol in Industrial Automation Networks" ISPCS07 Special Issue of the IEEE Transactions on Instrumentation and Measurement, June 2009, Volume 58, Issue 6, pp. 1849-1857.

EP 2034642 A1 discloses a method for transmitting synchronization messages in a communication network, where the communication network comprises a plurality of network nodes communicating with one another, which each contain an internal clock, which is clocked at a node clock frequency assigned to the respective network node. The synchronization messages transmitted in the communication network are used for time synchronization of the internal clocks of the network nodes and contain the pulse counter status (and/or according to the first slave, the estimated pulse counter status) of a reference clock, which operates at a predetermined reference clock frequency. The pulse counter status is estimated by each network node and updated in the synchronization message. When estimating the pulse counter status, alterations in the reference clock frequency are taken into account. An accurate determination of the pulse counter status is achieved by a function, using an approximation of the change over time of the pulse ratio between the reference clock frequency and the node clock frequency, whereby the pulse ratio may be predicted when transmitting a new synchronization message and an accurate updated pulse counter status may be determined based on the predicted pulse ratio.

In conventional methods, an estimated reference clock-pulse counter status is determined, which represents an estimation of a pulse counter status of the reference clock in each network node. The estimated reference clock-pulse counter status is, however, overlaid with noise and does not have a continuous path over the time, because it is re-calculated each time a synchronization message is received. With the requirement, in practice, for accuracy (typically a micro-second) of the estimated reference clock-pulse counter status, the number of network nodes which may be incorporated in the time synchronization is thus strictly limited.

SUMMARY OF THE INVENTION

It is therefore an object of the invention to provide a device and a method for time synchronization in a communication network, by which an estimation of the pulse counter status of a reference clock is further improved and/or by which a greater number of network nodes may be incorporated in the time synchronization with a predetermined level of accuracy.

This and other objects and advantages are achieved in accordance with the invention by a device for time synchronization in a communication network, where the communication network comprises a plurality of network nodes communicating with one another which each contain an internal clock. Here, the network nodes are set up for time synchronization of their internal clocks using a reference clock of a reference node. At least one network node is set up for determining an estimated reference clock-pulse counter status, which represents an estimation of a reference clock-pulse counter status of the reference clock. In an embodiment, the device is contained in the network nodes and comprises a controller. Furthermore, the device is set up to determine a controlled pulse counter status using the controller, where the controlled pulse counter status represents an estimation of the reference clock-pulse counter status and having a continuous path.

The object of the invention is also achieved by a method for time synchronization in a communication network, where the communication network comprises a plurality of network nodes communicating with one another. Here, the network nodes each contain an internal clock. The time synchronization of the internal clocks of the network nodes takes place using a reference clock of a reference node. At least one reference node determines an estimated reference clock-pulse counter status, which represents the estimation of the reference clock-pulse counter status of the reference clock.

In an embodiment of the method, the at least one network node determines, by a controller, a controlled pulse counter status, which represents the estimation of the reference clock-pulse counter status and has a continuous path.

In addition to the method and the device above-described, the invention further comprises a computer-readable storage medium on which a computer program is stored, which executes the method above-described when it is processed in a microprocessor.

The invention further comprises a computer program which is processed in a microprocessor and thus executes the method above-described.

By the method and the device that is optionally implemented by computer, the previously determined estimated reference clock-pulse counter status is reprocessed in each network node by a controller. As a result, the controller advantageously reduces the noise via the estimated reference clock-pulse counter status, and with the controlled pulse counter status provides a continuously synchronized time (with a continuous path) for each network node, as is necessary for typical industrial requirements. Thus, by using the controller, a greater number of network nodes may be included with a predetermined level of accuracy for the time synchronization.

Thus, for the actual requirement of each network node (not, however, for forwarding to the next network node), the estimated reference clock-pulse counter status is no longer used as an estimation of the reference clock-pulse counter status, but rather the controlled pulse counter status is used, which is determined by the controller by tracking the estimated reference clock-pulse counter status. Consequently, the sudden changes of the estimated reference clock-pulse counter status when newly calculated after receiving a synchronization message, which may not be tolerated in many industrial applications, are converted into the continuous path of the controlled pulse counter status. Interruptions from time-dependent processes are thus reduced. Moreover, the controlled pulse counter status has, on average, less deviation from the reference clock-pulse counter status than the estimated reference clock-pulse counter status.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in detail hereinafter with reference to the accompanying figures, in which.

DETAILED DESCRIPTION OF THE PRESENTLY PREFERRED EMBODIMENTS

The method according to the invention is preferably used in an industrial automation system, in which distributed components of the system communicate with one another to control manufacturing sequences, such as during automobile production. To this end, the individual components communicate with one another over a communication network in a wireless and/or wired manner. The components thus represent network nodes of the communication network.

Figure 1:
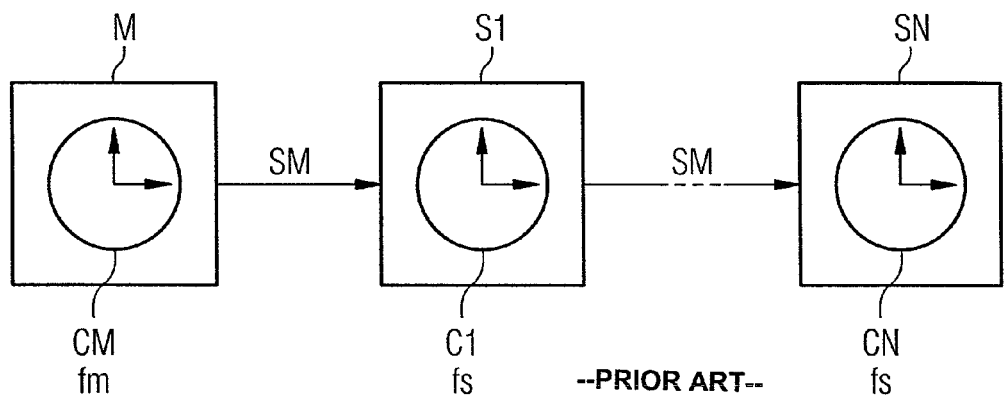
FIG. 1 is an illustration of a schematic block diagram of a plurality of conventional network nodes in a communication network, between which synchronization messages are transmitted in accordance with the prior art.

Network nodes S1 to SN (i.e., slaves) are shown in FIG. 1, where each network node S1 to SN has a corresponding internal clock C1, . . . CN. Each of these clocks operates at a predetermined node clock frequency fs (i.e., slave clock frequency), which in some instances may be different for different network nodes S1 to SN. Moreover, in the communication network of FIG. 1, a reference node M (customary technical term: master) is provided, which has a reference clock CM, which predetermines a reference clock frequency fm, to which all internal clocks C1, . . . CN of the network nodes S1 to SN are to be set. In order to achieve this, synchronization messages SM are transmitted by the reference node M at constant intervals comprising a predetermined number of pulses of the reference clock CM. Each of these synchronization messages SM thus contains a pulse counter status of the reference clock CM, i.e., the pulses of the reference clock CM already expired during the operation of the method. This pulse counter status is thus transmitted with each synchronization message SM.

The reference node M and the individual network nodes S1 to SN communicate with one another in sequence, where synchronization messages are transmitted from the reference node M to the network node S1 and therefrom to the network node S2, etc., as far as the network node SN. In order to achieve an accurate time synchronization in the individual network nodes S1 to SN, the pulse counter status in the synchronization messages SM in the individual network nodes S1 to SN must be updated. Thus a time delay, which is required between the transmission of a synchronization message SM from the preceding network node S1 to SN (and/or from the reference node M) and the transmission of the synchronization message SM from the respective network node S1 to SN to the next network node S1 to SN, is known in each network node S1 to SN. This time delay is made up of two time intervals LDi and BDi (i=1, . . . , N), where the time intervals are able to be different for each network node S1 to SN. LDi is thus the time interval which is required for transmitting the message from the preceding network node Si−1 to the respective network node Si (LD=Line Delay). BDi is a processing time which is required in the network node Si for processing a received synchronization message before transmission of the synchronization message to the next network node (BD=bridge delay). This delay time is indicated in the respective network node S1 to SN in pulses according to the node clock frequency fs. The sequence of the synchronization of the internal clocks is thus sufficiently known to the person skilled in the art and is therefore not explained in detail.

The following exemplary embodiments of the invention are based on the communication network shown in FIG. 1, which comprises the network nodes S1 to SN communicating with one another, which each contain the internal clock C1 to CN and the network nodes S1 to SN being set up for time synchronization of their internal clocks C1 to CN by the reference clock CM of the reference node M.

At least one network node S1 and/or, in some instances, all network nodes S1 to SN are set up by the conventional method for determining an estimated reference clock-pulse counter status RMT, which represents an estimation of a reference clock-pulse counter status CMT of the reference clock CM.

Figure 2:
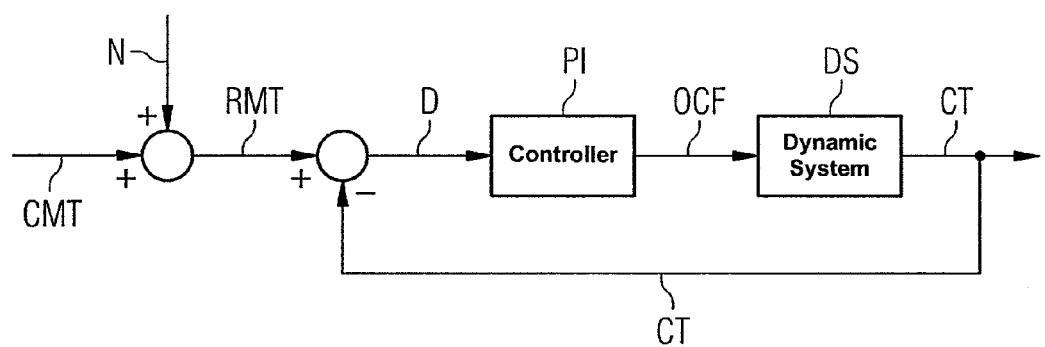
FIG. 2 is an illustration of a closed-loop circuit for time synchronization in a communication network in accordance with the invention.

FIG. 2 is an illustration of a closed-loop circuit for time synchronization in a communication network in accordance with the invention. Here, the closed-loop circuit is a schematic representation of a control system that is implemented in at least one of the network nodes S1 to SN, and/or in some instances even in all network nodes S1 to SN. As a reference variable, i.e., as a desired value of the control system, the previously determined estimated reference clock-pulse counter status RMT is supplied to the closed-loop circuit. As described above and as shown in FIG. 2, the estimated reference clock-pulse counter status RMT is only an estimation of the reference clock-pulse counter status CMT, because the reference clock-pulse counter status CMT may only be communicated by influencing an interruption N on the respective network node.

A control deviation D between the estimated reference clock-pulse counter status RMT and a controlled pulse counter status CT is supplied to a controller PI as a control deviation and input signal. The controlled pulse counter status CT is thus the controlled variable of the closed-loop circuit and is used for the respective network node as a virtual clock, which has improved properties both relative to the internal clock of the network node and to the estimated reference clock-pulse counter status RMT. The purpose of the controller PI is to keep the controlled pulse counter status CT, as a controlled variable, as far as possible on the estimated reference clock-pulse counter status as a reference variable. To this end, the controller PI forwards a control deviation compensation factor OCF, as a manipulated variable and output signal, to the controlled system, in FIG. 2 a dynamic system DS. Here, the dynamic system DS is a virtual clock with the controlled pulse counter status CT, which is calculated by the internal clock of the network node being followed, where the pulse counter status thereof is continuously corrected by the control deviation compensation factor OCF. The corresponding formula is indicated below.

The control deviation D is thus defined as:

$$\text{offset}(t) = RMT(t) - CT(t).$$

A continuous linear controller, i.e., a Proportional Integral (PI) controller or a Proportional Integral-Derivative (PID) controller, is suitable as the controller PI. As a result, it is ensured that the controlled pulse counter status CT has a continuous path.

The control deviation compensation factor OCF estimates a current ratio of a reference clock frequency fm of the reference clock CM to a node clock frequency fs of the internal clock of the network node. The control deviation compensation factor OCF is, for example, calculated according to the time-discrete set of rules by using the following formula:

$$OCF_n^i = OCF_n^{i-1} + k_p(\text{offset}_n^i - \text{offset}_n^{i-1}) + k_i \text{offset}_n^{i-1}(t(i) - t(i-1))$$

This is a direct discretization of the known continuous PI controller. Other controllers with an integral portion might also be suitable.

In this case, $\text{offset}_n^i = RMT_n^i - CT_n^i$. $\text{offset}_n^i$ thus denotes the control deviation of the network node n at the time t(i). $RMT_n^i$ denotes the reference clock-pulse counter status RMT estimated by the network node n at the time t(i). $CT_n^i$ denotes the controlled pulse counter status CT determined by the network node n at the time t(i). $OCF_n^i$ denotes the control deviation compensation factor OCF of the network node n at the time t(i). $k_p$ denotes the proportional coefficient and/or the proportional factor and $k_i$ denotes the integral-action coefficient of the PI controller.

The control deviation compensation factor OCF is thus a measure of the time-dependent ratio estimated by the controller PI between the reference clock frequency fm and the node clock frequency fs. The controlled pulse counter status CT is calculated by the internal clock of the network node being followed, the pulse counter status thereof being continuously corrected by the control deviation compensation factor OCF:

$$CT_n^i = CT_n^{i-1} + OCF_n^{i-1}(S_n^i - S_n^{i-1}).$$

In this case, $S_n^i$ is the pulse counter status of the internal clock of the network node n at the time t(i).

The calculation of the controlled pulse counter status CT may occur in any short time intervals, whereby the controlled pulse counter status CT becomes a continuous-time function. The closed-loop circuit in FIG. 2 does not provide any direct influence of the estimated reference clock-pulse counter status RMT on the controlled pulse counter status CT. Accordingly, sudden changes in the estimated reference clock-pulse counter status RMT do not result in sudden changes in the controlled pulse counter status CT. Thus, the controlled pulse counter status CT provides a uniform, continuous virtual clock which may be used for time-critical applications.

Tests have shown that the controlled pulse counter status CT relative to the estimated reference clock-pulse counter status RMT represents an improved estimation of the reference clock-pulse counter status CMT, in particular with increasing intervals of the respective network node from the reference node. In a network comprising 160 network nodes which, for example, has been arranged in series, it is possible to observe a reduction of 18-35% of the maximum number of errors.

Thus the controller PI is used to calculate the control deviation compensation factor OCF, which in turn is used as the gradient of the controlled pulse counter status CT. Thus, an assurance is provided that the controlled pulse counter status CT will follow the estimated reference clock-pulse counter status RMT without reproducing the sudden changes thereof.

Figure 3:
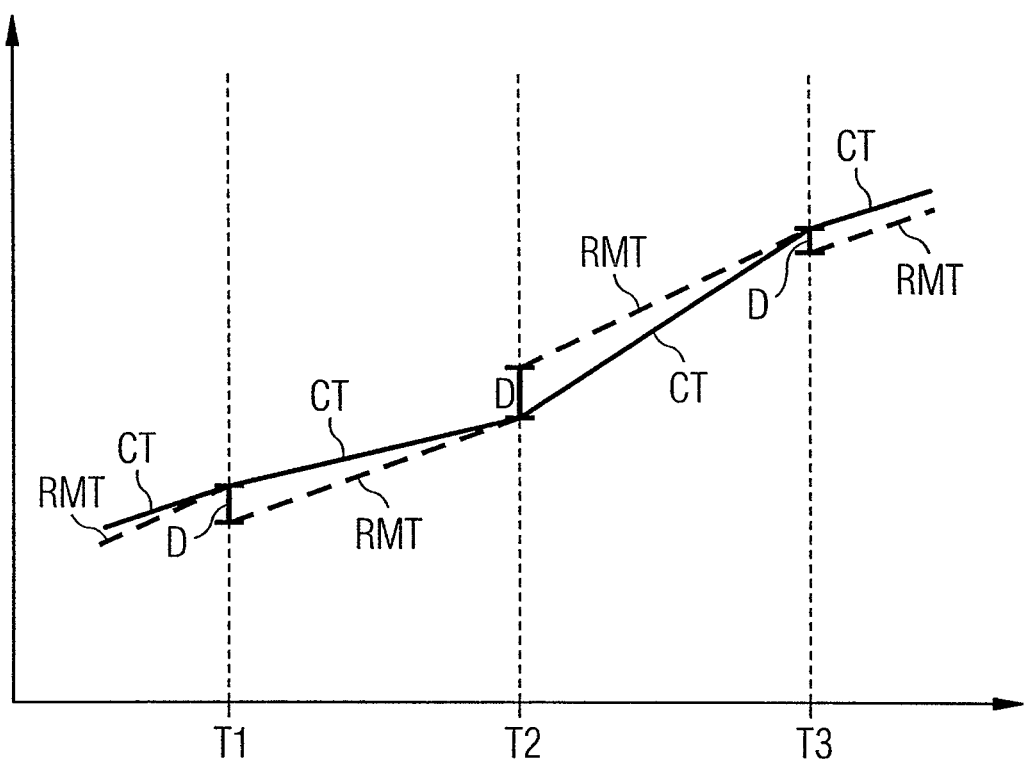
FIG. 3 is an illustration of a graphical plot indicting a comparison of the estimated reference clock-pulse counter status with the controlled pulse counter status according to a first variant in accordance with the invention.

FIG. 3 is a graphical plot showing a comparison of the estimated reference clock-pulse counter status RMT and the controlled pulse counter status CT according to a first variant. Along the abscissa, an absolute time is shown with the times T1, T2 and T3. The respectively estimated reference clock-pulse counter status RMT and/or the respective controlled pulse counter status CT are plotted along the ordinate. The lines for the estimated reference clock-pulse counter status RMT are shown as dotted lines, as the estimated reference clock-pulse counter status RMT is only calculated at the times T1, T2 and T3. The dotted lines show a possible linear extrapolation of the estimated reference clock-pulse counter status RMT. In the exemplary embodiment depicted in FIG. 3, the controller PI is run at each of the times T1, T2 and T3. The controller PI is thus set up so that each controlled time CT continuously approaches the extrapolated estimated reference clock-pulse counter status RMT before the next time that the controller is run. As each estimated reference clock-pulse counter status RMT is newly calculated at the times T1, T2 and T3, for example, based on newly arrived synchronization messages SM, each sudden change occurs at the times T1, T2 and T3 relative to the extrapolated time path of the estimated reference clock-pulse counter status RMT, as the calculation of the estimated reference clock-pulse counter status RMT is disrupted by the interruption N shown in FIG. 2. A control deviation D, which is shown graphically in FIG. 3 at each of the times T1, T2 and T3, results from the difference between the controlled pulse counter status CT and the newly calculated estimated reference clock-pulse counter status RMT. The control deviation D is supplied to the controller PI as an input signal. The controller PI then ensures that the controlled pulse counter status CT again approaches the extrapolated estimated reference clock-pulse counter status RMT, as shown in FIG. 3. It is of particular importance, therefore, that the controlled pulse counter status CT in FIG. 3 has a continuous path. In contrast to the estimated reference clock-pulse counter status RMT, the controlled pulse counter status CT has no sudden changes. This continuous path is advantageous, in particular, for time-critical applications.

Figure 4:
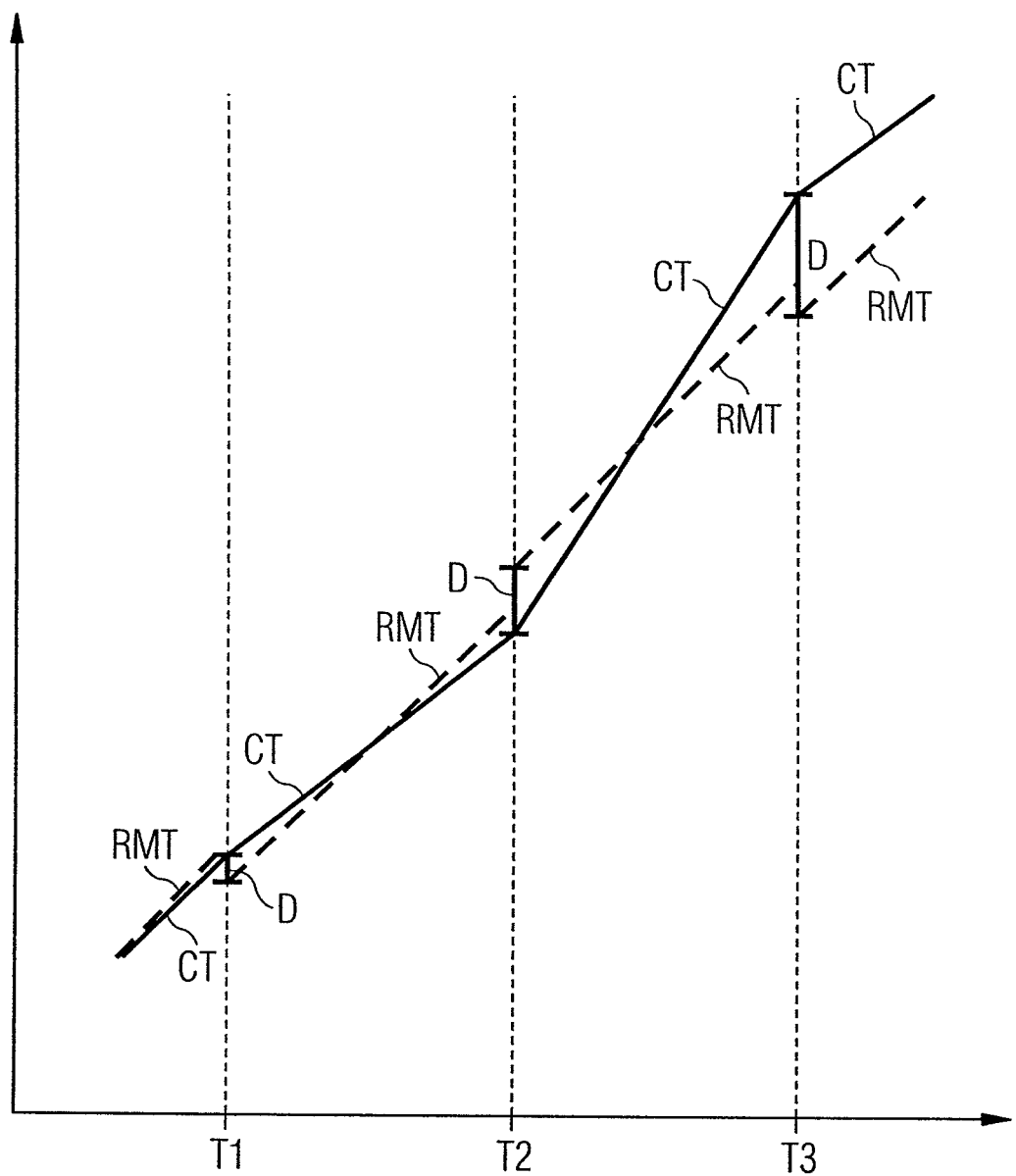
FIG. 4 is an illustration of a graphical plot indicating a comparison of the estimated reference clock-pulse counter status with the controlled pulse counter status according to a second variant in accordance with the invention.

FIG. 4 is another graphical illustration along the abscissa indicting an absolute time with the times T1, T2 and T3. Along the ordinate, the estimated reference clock-pulse counter status RMT as well as the controlled pulse counter status CT are again plotted. The lines for the estimated reference clock-pulse counter status RMT are again shown in dotted lines, as the estimated reference clock-pulse counter status RMT is only calculated at the times T1, T2 and T3. Here, the dotted lines merely depict a possible linear extrapolation of the estimated reference clock-pulse counter status RMT. In the alternative exemplary embodiment to FIG. 3, shown in FIG. 4, the controller PI is also run at the times T1, T2 and T3. The controller PI is set up, however, so that subsequent to a half time interval between the times T1, T2 and T3 for running the controller PI, the controlled pulse counter status CT already approaches the extrapolated estimated reference clock-pulse counter status RMT. The controller PI may also be set up in any other manner, for example, for an approach after 75% or 150% of the time interval between the times T1, T2 and T3. At the time T1, the controlled pulse counter status CT is slightly lower than the extrapolated, previously estimated reference clock-pulse counter status RMT. The newly calculated estimated reference clock-pulse counter status RMT at the time T1, however, is even lower so that a control deviation D results. The control deviation D between the controlled pulse counter status CT and the newly calculated, estimated reference clock-pulse counter status RMT is supplied to the controller PI. The same procedure occurs at the times T2 and T3.

The controller PI may, for example, be arranged on a network card, such as a network card with a separate real-time clock and time stamp unit. The controller PI may thus be implemented in hardware but also in software. An embodiment of the real-time clock and the time stamp unit in hardware is advantageous due to the high requirements for chronological accuracy. As an alternative to the real-time clock on the network card, a system clock of the network node may also be accessed.

In a development of the disclosed exemplary embodiments, the time synchronization occurs in accordance with the International Electrotechnical (IEC) Standard No. 61158 Type 10, i.e., Process Field Network (PROFINET), and alternatively or additionally according to the Precision Transparent Clock Protocol (PTCP) in accordance with the IEC Standard No. 61158 Type 10 PTCP, which is also referenced as "Profile" in the Institute of Electrical and Electronic Engineers Standard No. 1588 V2. Here, the reference node M is used as the master, whilst the network nodes S1-SN are used as slaves according to the respective standards. In addition, a multicast network, such as an Ethernet, is suitable as a communication network.

Figure 5:
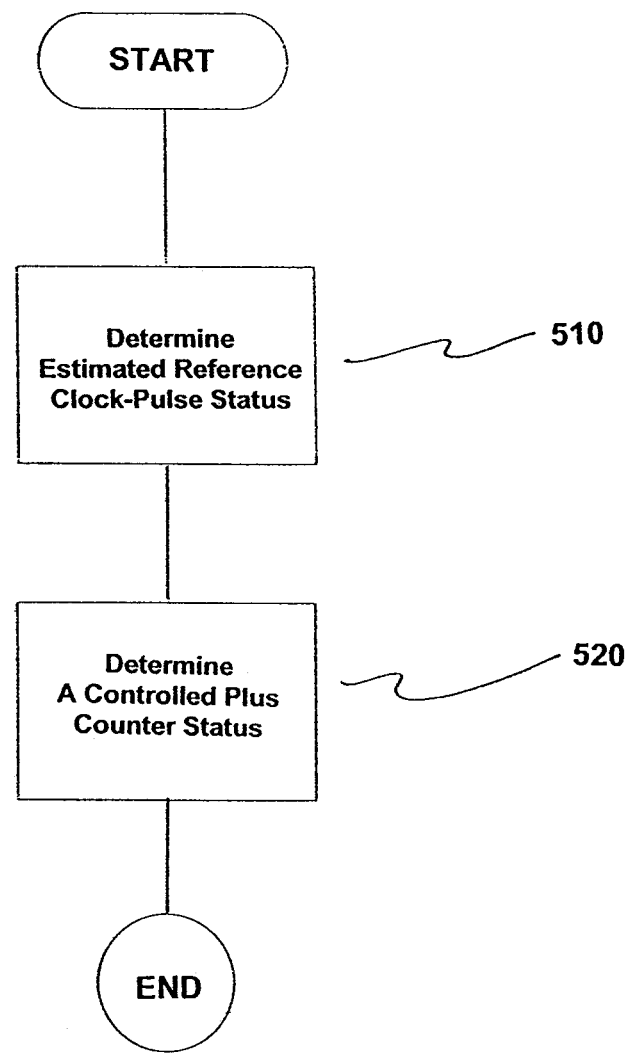
FIG. 5 is a flow chart illustrating a method in accordance with an embodiment of the invention.

FIG. 5 is a flow chart illustrating a method for time synchronization in a communication network. The communication network comprises a plurality of network nodes S1 to SN communicating with one another, where the plurality of networks contain an internal clock, and a time synchronization of each internal clock of each of the plurality of network nodes S1 to SN occurs using a reference clock of a reference node. The method comprises determining, by at least one network node of the plurality of network nodes, an estimated reference clock-pulse counter status which represents an estimation of a reference clock-pulse counter status of the reference clock, as indicated in step 510. A controlled pulse counter status which represents an estimation of the reference clock-pulse counter status and has a continuous path is then determined at the at least one network node using a controller, as indicated in step 520.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for time synchronization in a communication network comprising a plurality of network nodes communicating with one another, each of the plurality of network nodes containing an internal clock and being configured for time synchronization of their internal clocks by a reference clock of a reference node, at least one network node of the plurality of network nodes being configured to determine an estimated reference clock-pulse counter status representing an estimation of a reference clock-pulse counter status of the reference clock, the device comprising:
a controller disposed in the at least one network node of the plurality of network nodes, said controller being configured to determine a controlled pulse counter status, the controlled pulse counter status representing the estimation of the reference clock-pulse counter status and having a continuous path.

2. The device as claimed in claim 1, wherein the controller is a continuous linear controller.

3. The device as claimed in claim 2, wherein the continuous linear controller is one of a Proportional-Integral (PI) controller and a Proportional-Integral-Derivative (PID) controller.

4. The device as claimed in claim 1, wherein an input signal of the controller is a control deviation between the estimated reference clock-pulse counter status and the controlled pulse counter status;
wherein a manipulated variable of the controller is a control deviation compensation factor which estimates a current ratio of a reference clock frequency of the reference clock to a node clock frequency of the internal clock of the at least one network node; and
wherein the controller for calculating the controlled pulse counter status is set up, the internal clock of the at least one network node being followed and the pulse counter status thereof being continuously corrected by the control deviation compensation factor.

5. The device as claimed in one of claim 1, wherein the device comprises a network card.

6. The device as claimed in one of claim 5, wherein the network card includes a separate real-time clock and time stamp unit.

7. A method for time synchronization in a communication network, the communication network comprising a plurality of network nodes communicating with one another, each of the plurality of network nodes containing an internal clock, and a time synchronization of each internal clock of each of the plurality of network nodes occurring using a reference clock of a reference node, the method comprising:
determining, by at least one network node of the plurality of network nodes, an estimated reference clock-pulse counter status which represents an estimation of a reference clock-pulse counter status of the reference clock; and
determining, at the at least one network node of the plurality of network nodes using a controller, a controlled pulse counter status, the controlled pulse counter status representing an estimation of the reference clock-pulse counter status and having a continuous path.

8. The method as claimed in claim 7, wherein the steps of determining an estimated reference clock-pulse counter status and determining a controlled pulse counter status are performed at each of the plurality of network nodes.

9. The method as claimed in claim 7, wherein the time synchronization occurs in accordance with at least one of an International Electrotechnical Commission (IEC) Standard No. 61158 Type 10 and a Precision Transparent Clock Protocol (PTCP) in accordance with the IEC Standard No. 61158 Type 10; and wherein the reference node is used as a master and each of the plurality of network nodes is used as a slave according to a respective standard, and the communication network is a multicast network.

10. The method as claimed in claim 9, wherein the IEC Standard No. 61158 Type 10 is Process Field Network (PROFINET) and the multicast network is an Ethernet.

11. The method as claimed in claim 7, wherein the controller is a continuous linear controller.

12. The method as claimed in claim 11, wherein the continuous linear controller is one of a Proportional Integral (PI) controller and a Proportional Integral-Derivative (PID) controller.

13. The method as claimed in claim 11, wherein the continuous controller is a digital continuous linear controller.

14. The method as claimed in claim 7, further comprising:
supplying a control deviation between the estimated reference clock-pulse counter status and the controlled pulse counter status to the controller;
calculating, at the controller as a manipulated variable, a control deviation compensation factor which estimates a current ratio of a reference clock frequency of the reference clock to a node clock frequency of the internal clock of the at least one network node of the plurality of network nodes; and
calculating, by the internal clock of the at least one network node being followed, the controlled pulse counter status, and continuously correcting the pulse counter status by the calculated control deviation compensation factor.

15. A network node comprising:
an internal clock, said network node being configured for time synchronization of the internal clock by a reference clock of a reference node; and
a controller disposed in the network node and configured to determine a controlled pulse counter status, the controlled pulse counter status representing an estimation of a reference clock-pulse counter status of the reference clock and having a continuous path.

16. A non-transitory computer-readable storage medium encoded with a computer program executed by a computer that causes time synchronization in a communication network, the communication network comprising a plurality of network nodes communicating with one another, each of the plurality of network nodes containing an internal clock, and a time synchronization of each internal clock of each of the plurality of network nodes occurring using a reference clock of a reference node, the computer program comprising:
program code for determining, by at least one network node of the plurality of network nodes, an estimated reference clock-pulse counter status which represents an estimation of a reference clock-pulse counter status of the reference clock; and
program code for determining, at the at least one network node of the plurality of network nodes using a controller, a controlled pulse counter status, the controlled pulse counter status representing an estimation of the reference clock-pulse counter status and having a continuous path.

* * * * *